(12) United States Patent
Rosenqvist

(10) Patent No.: US 7,034,883 B1
(45) Date of Patent: Apr. 25, 2006

(54) AUTOMATIC FOCUSING

(75) Inventor: Anders Rosenqvist, Lund (SE)

(73) Assignee: Cellavision AB, Lund (SE)

( * ) Notice: Subject to any disclaimer, the term of this patent is extended or adjusted under 35 U.S.C. 154(b) by 1190 days.

(21) Appl. No.: 09/634,906

(22) Filed: Aug. 9, 2000

Related U.S. Application Data

(60) Provisional application No. 60/150,439, filed on Aug. 24, 1999.

(30) Foreign Application Priority Data

Aug. 10, 1999 (SE) .................................... 9902863

(51) Int. Cl.
*H04N 5/232* (2006.01)
*H04N 7/18* (2006.01)

(52) U.S. Cl. ........................................ 348/345; 348/79

(58) Field of Classification Search .................. 348/79, 348/80, 335, 345, 346, 353, 354; 250/201.2, 250/201.3, 201.4; 382/255, 256, 263
See application file for complete search history.

(56) References Cited

U.S. PATENT DOCUMENTS

| | | | |
|---|---|---|---|
| 3,819,913 A * | 6/1974 | Carter et al. .................. 377/10 |
| 4,745,271 A | 5/1988 | Benedetti et al. | |
| 4,876,602 A | 10/1989 | Zwirn et al. | |
| 4,945,220 A * | 7/1990 | Mallory et al. ........... 250/201.3 |
| 5,239,170 A * | 8/1993 | Hughlett ................... 250/201.3 |
| 5,604,344 A * | 2/1997 | Finarov ..................... 250/201.3 |
| 5,675,141 A * | 10/1997 | Kukihara .................. 250/201.3 |
| 5,867,217 A | 2/1999 | Okino et al. | |
| 5,912,699 A | 6/1999 | Hayenga et al. | |
| 5,995,143 A * | 11/1999 | Price et al. .................. 348/345 |
| 6,504,611 B1 * | 1/2003 | Kogan et al. ................ 356/399 |

FOREIGN PATENT DOCUMENTS

| | | |
|---|---|---|
| DE | 4226523 A1 | 2/1994 |
| DE | 19537376 A1 | 4/1996 |

* cited by examiner

*Primary Examiner*—Ngoc-Yen Vu
*Assistant Examiner*—Luong T. Nguyen
(74) *Attorney, Agent, or Firm*—Cooper & Dunham LLP

(57) ABSTRACT

A method and device for automatic focusing in an optical system is provided. A structure having a periphery is reproduced by an objective and an electronic representation of the structure reproduced by the objective is generated. The intensity variation at the periphery of the structure is analyzed in the electronic representation. An application focus value, indicating how the current focus position of the objective is related to an optimal focus position for an application, is determined using the intensity variation. The application focus value indicates whether the current focus position of the objective is above or below the optimal focus position and how far away the current focus position of the objective is from the optimal focus position.

31 Claims, 9 Drawing Sheets

AUTOMATIC FOCUSING

CROSS REFERENCE TO RELATED APPLICATION

This application claims the benefit of U.S. Provisional Application No. 60/150,439, filed Aug. 24, 1999.

FIELD OF THE INVENTION

The present invention relates to a method in an optical system, comprising the steps of reproducing a structure having a periphery by means of an objective and producing an electronic representation of the structure reproduced by the objective. The invention also relates to devices for use in an optical system and a storage media, on which a computer program for use in an optical system is stored.

BACKGROUND ART

Microscopes and other optical systems need be focused on the object or the structure which the system reproduces. For a system which scans an object, continuous refocusing operations are necessary since the object is seldom planar. For instance, a height variation by some tenths of a micrometer of the object is sufficient for the object to get into the outer edge of the depth of focus of a high-resolution light-optical microscope objective if no refocusing takes place. A microscope slide has greater height variations than that and, besides, the preparation has variations in respect of thickness as well as position in the vertical direction, and the object holding mechanism does not allow movements of the object which are perfectly perpendicular to the optical axis of the system. Therefore automatic scanning microscopes must be equipped with an automatic focusing system.

The purpose of an automatic focusing system can be said to reside in the steps of somehow measuring the current focus, deciding on a focus correction in respect of sign as well as amount, and carrying out the correction which, for example, results in a raising or lowering of the objective relative to the object.

A focusing system must satisfy many requirements. The system can be assessed, among other things, according to how good a focus it achieves, how robust it is relative to different kinds of objects, how rapidly it achieves focus, how cost effective it is to manufacture and maintain and what demands it places on the surroundings in the form of, for instance, space and power requirements.

The measurement of focus can be carried out actively or passively. An example of active measurement is utilization of infrared light reflected by the object, like in some automatically focusing still cameras. An example of passive measurement is utilization of the contents of the images from an image sensor. The image sensor can be the image sensor existing in a microscope or an image sensor which is used only to measure focus. The drawbacks of adding optics and one or more sensors in a parallel measuring system are first an increasing system complexity, expenses and space requirements, second several non-ideal components in the optical beam path, and third the need for calibrating the position of the measuring system for optimal focus relative to the same of the useful, existing sensor.

Only passive focus systems will be discussed in the following. On the basis of images from one or more image sensors, the focus system should thus set a focus which in some sense is optimal. Normally, an optimal focus is defined as the focus which is experienced by a specific individual to be optimal for the application at issue. To be able to decide which is the optimal focus, the focus system uses a so-called focus measure. The focus measure is a function used to calculate a series of scalar focus values for different focus positions. It is applied to an entire image or a partial image from a sensor to obtain a focus value for each image/partial image. If the focus measure functions well, it has a maximum (or minimum) at the desired best focus. An example of a traditional focus measure is the sample variance of the intensity values in an image, where the sample variance is defined as $$V(A_k) = \frac{1}{(mn-1)} \sum_{i=1}^{m} \sum_{j=1}^{n} \tilde{a}_{ijk}^2, \quad \text{(Equ. 1)}$$

wherein $$\tilde{a}_{ijk} = a_{ijk} - \frac{1}{mn} \sum_{i=1}^{m} \sum_{j=1}^{n} a_{ijk}, \quad \text{(Equ. 2)}$$

i.e. the image adjusted to the sample mean value zero.

For the traditional focus measures, the peak value depends on the detailed contents of the image and is therefore not known in advance. It is thus not possible to decide on the basis of a single such focus value how great a physical focus correction is required to reach the position for the best focus. Since each value, except the peak value, can arise on both sides of the peak, it is also not possible to decide on the basis of a single such focus value on which side of the peak the image is taken. To maximize the value of a traditional focus measure, some kind of search is therefore necessary.

When images from one sensor only are used, the search will take long since the focus measure must be evaluated for a number of different physical positions of the objective. The traditional focus measures do not provide directional information, which further causes the first search step to be a step in the wrong direction in 50% of the cases.

A system having a plurality of sensors which are arranged in several image planes can more rapidly find its way with the useful sensor to the maximum of the focus measure. One reason for the time saving is that for each physical position of the objective, images corresponding to a plurality of focus positions will be obtained—one for each image plane. The search can therefore be effected with fewer physical positions of the objective.

An example of such a focus system with a plurality of sensors is disclosed in U.S. Pat. No. 5,912,699. In this system, the sign of the focus correction is determined by means of a standardized difference of the focus measures from two additional image sensors which have image planes above and below the useful image sensor. The standardized difference serves as a qualitative measure indicating whether it is necessary to focus further and, if so, in which direction.

Summing up, there are at least two problems caused by the prior art-technique of automatic focusing, viz. on the one hand the fact that a focus measure does not always yield a peak for optimal focus and, on the other hand, the fact that a plurality of images from different focus positions of the objective are necessary to find the optimal focus.

SUMMARY OF THE INVENTION

One object of the present invention is to eliminate or at least alleviate the above-mentioned problems.

Another object is to provide a method, a device and a storage medium which can use focus information in images for other purposes than auto focusing.

These objects are achieved wholly or partially by the methods, the devices and the storage media according to the appended claims.

More specifically, the invention relates according to a first aspect to a method in an optical system, comprising the steps of reproducing a structure having a periphery by means of an objective, producing an electronic representation of the structure reproduced by the objective, analyzing how an intensity in the electronic representation varies at the periphery of the structure, and determining, by means of said intensity variation, an application focus value which indicates how the current focus position of the objective is related to an optimal focus position.

It has surprisingly been found that in the reproduction of certain structures, intensity variations arise at the periphery of the structure, which contain directly usable information about how the current focus position is placed in relation to the optimal one. These intensity variations constitute the base of a new focus measure, which allows that from, for instance, a single image of a structure, it is possible to determine a focus correction to achieve the optimal focus.

This new focus measure is in the following referred to as a predictive focus measure since it provides the possibility of predicting from a single focus value a suitable focus correction.

It has also been found that the predictive focus measure functions better than traditional focus measures for certain structures.

The predictive focus measure also functions on part of an image, which in turn implies that it is possible to determine a plurality of focus values for one image. This is advantageous since it will then be possible to rapidly obtain a value at the beginning of the read out of an image from an image sensor and, thus, to have time to correct an error position, if any, before the next image is exposed. Moreover, it is possible to find out how the focus varies with the position in the image. With traditional focus measures, this cannot be done since it is not possible to compare its focus value for one partial image with its focus value for another partial image.

Structure should in this context be interpreted in a very wide sense. It can be a separate, three-dimensional object or part of an object. The structure is characterized in the electronic representation by being a coherent area which at its periphery has an intensity which differs from the one in the area around the structure. The actual structure differs from its surroundings by having a different extent parallel with the longitudinal axis of the objective compared with the surroundings. The periphery of the structure thus indicates a height difference from the surroundings. Alternatively, the structure can have a different refractive index or other optical properties which result in the optical path through the structure parallel with the longitudinal axis of the objective differing from that of the surroundings. In other words, the optimal focus position for the structure differs from that of its surroundings.

It should also be mentioned that the electronic representation can be one-dimensional or two-dimensional, and that the analysis of the intensity variation can be carried out in one or more positions along the periphery of the structure. The entire periphery can, but thus need not, be used. However, the analysis need only be carried out at the periphery of the structure, not on other parts of the structure and not on the entire electronic representation.

Moreover, objective should be considered to include all optical reproducing systems which can reproduce an object on a sensor with a depth of focus and resolution which are sufficient for the application at issue.

The application focus value, which thus is a focus value indicating how the current focus position of the objective is related to an optimal focus position of the application at issue, can, of course, be used to provide a desired refocusing. However, it can also be used to perform other controls. In a scanning microscope, one may want to avoid too frequent refocusing operations. It is then possible to use the application focus value to decide if one is within or outside a predetermined focusing range.

In an advantageous embodiment of the method, an application focus value is determined, which indicates whether the current focus position of the objective is above or below the optimal focus position, i.e. whether the focus plane of the objective and the structure are to be closer to or further away from each other in order to obtain the optimal focus. In this case, the focus value thus yields the direction of the focus correction, and therefore, when making a search, there is no risk of going in the wrong direction.

Further the application focus value can advantageously be determined in such manner that it indicates how far away the current focus position of the objective is from the optimal focus position. Thus, the focus value gives in this case the magnitude of the focus correction, so that only one correction need be carried out to obtain the optimal focus value.

The application focus value is suitably used to provide a control signal for changing the mutual positioning of the objective and the structure with a view to achieving a desired focusing. The desired focusing need not always occur to the optimal focus position or even towards increased depth of focus, but it can also consist of a defocusing of a predetermined magnitude.

In an advantageous embodiment, the control signal is generated on the basis of said application focus value only. However, it is possible that, in some applications, one may want to generate the control signal on the basis of a combination of a plurality of focus values calculated by means of the predictive focus measure only, or by means of the predictive focus measure and traditional focus measures. One may also want to switch between different focus measures when calculating the control signal. One focus measure can be used, for instance, for coarse focusing and another for fine focusing.

In an advantageous embodiment, the electronic representation is produced by means of a single light-sensitive sensor and a single exposure. In this case, thus no mutual displacement of the objective and the structure is required for determining a focus correction, and no additional components are necessary either.

The light-sensitive sensor can be a black-and-white sensor or a one-chip color sensor. The light-sensitive sensor may also consist of a plurality of partial sensors which record light from one and the same image plane.

The step of analyzing how the intensity varies at the periphery of the structure may comprise using predetermined information about the appearance of the intensity variation in different focus positions of the objective in relation to the optimal focus position. As will be evident from the following description, the intensity variation has a characteristic appearance, on the basis of which it is possible to assess how the current focus position is related to the optimal one. This property of the intensity variation makes it possible to use a neural network for determining the focus value.

The analysis of how the intensity varies at the periphery of the structure advantageously comprises measuring at least one of the following parameters for the intensity variation: the inclination, the height of an overshoot, the width of an overshoot, the width of an undershoot, the presence of a terrace, and the width of a terrace.

The intensity variation is advantageously analyzed essentially perpendicular to the periphery of the structure. In this manner, it is possible to sum up information from different parts of the periphery. When the structure has a curved periphery, the analysis can advantageously comprise the step of forming radial mean values of the intensity.

The method according to the invention is advantageously used for structures in which the variance of the intensity in the electronic representation of the structure is asymmetric for different focus positions around the focus position which yields optimal focusing of the objective on the structure. For such structures, the predictive focus measure has in fact been found to function better than the traditional variance measure.

As is evident from above, a neural network which has been trained with the aid of known intensity variations for known application focus values can be used to determine a current application focus value for the application. In another embodiment, the application focus value can be determined by determining a first focus value which indicates how the current focus position of the objective is related to the optimal focus position of the structure and a second focus value which indicates how the current focus position of the objective is related to the optimal focus position of the surroundings of the structure. In this case, use is thus made of the fact that in an image there is focus information from the structure and its surroundings which are located at different heights along the optical axis. The optimal focus position of the application at issue may coincide with the structure or the surroundings or be at any other height in relation to these. When the first and the second focus value are known it is easy to determine the application focus value for the application at issue.

The first and the second focus value can be determined by simulating the intensity variation at the periphery of the structure for simulated, varying first and second focus values and then choosing the first and the second focus value which correspond to the simulated intensity variation which best conforms with the intensity variation in the electronic representation.

One thus starts from a model of how a structure is reproduced at its periphery, i.e. in the transition to the surroundings, and then simulates different distances between on the one hand the structure and the focus plane of the objective and, on the other hand, the surroundings and the focus plane of the objective to control which combination of distances, i.e. which first and second focus values give an intensity variation which best resembles the actual one.

A model which has been found to function well is a model where the periphery of the structure is modeled as two superimposed, co-localized, complementary steps in emitted intensity.

When the first and the second focus value have been determined, they can be used to estimate the height difference between the structure and the surroundings of the structure. This can be of interest in connection with blood analysis in which in this way it is possible to estimate the thickness of a blood smear.

It has also been found that there are applications in which it is possible to utilize the focus information in the image in a manner similar to that described above, but in which it is not necessary to determine an application focus value. According to a second aspect of the invention, it therefore relates to a method, which comprises the steps of reproducing a structure having a periphery and surroundings, by means of an objective, producing an electronic representation of the structure reproduced by the objective, analyzing how an intensity in the electronic representation varies at the periphery of the structure, and determining, by means of this intensity variation, a first focus value which indicates how the current focus position of the objective is related to an optimal focus position with respect to the structure, and a second focus value which indicates how the current focus position of the objective is related to an optimal focus position with respect to the surroundings.

This method can be used, for example, to control the structure on the basis of the first and the second focus value.

In this case, one does thus not determine an application focus value for the application, but a first and a second focus value for the structure and the surroundings of the structure.

The control can, for example, concern a control that the height difference between the structure and the surroundings is the expected or comprise an estimate of the height difference.

That stated above regarding the first method also relates in applicable parts to this second method.

The application focus value described above can be determined and used in different devices. According to a third aspect of the invention, it therefore relates to a device having a first focus analyzer, which is adapted to receive an electronic representation of a structure produced through an objective, to analyze how an intensity in the electronic representation varies at the periphery of the structure, and to determine, by means of this intensity variation, an application focus value which indicates how the current focus position of an objective is related to an optimal focus position.

The focus analyzer can be implemented, for example, in software, in hardware, as a field programmable gate array (FPGA) or an application specific integrated circuit (ASIC) or by some other arrangement which can carry out the above-described function.

The focus analyzer can, for example, be included as a part in a device for automatic-focusing or for optical control. This device can in turn constitute a larger or smaller part of an optical system, such as a scanning microscope for classifying white blood corpuscles or for inspection of semiconductor circuits.

The advantages of the device are evident from the discussion above.

The objective which is used for reproducing the structure and a light-sensitive sensor for producing the electronic representation of the structure can be included in the actual device.

The sensor can be an analog or digital sensor of some kind which can produce a one-dimensional or two-dimensional electronic representation of the image of the structure that the objective produces in an image plane where the sensor is arranged. However, the sensor is advantageously a digital area sensor, and the electronic representation then is a digital image.

The sensor can be an additional sensor which is used merely for the automatic focusing, but it is advantageously a sensor which is used for producing images that are useful for the application at issue, for example the images that are used to classify white blood corpuscles in the above-mentioned scanning microscope.

As mentioned above, various instruments for different optical applications can be included in the device. In an advantageous embodiment, the device comprises, for instance, a microscope, said objective constituting the objective of the microscope. It is thus the same objective that is used to produce microscope images and to produce images for the automatic focusing.

As will be described below, the invention is particularly suitable for a scanning microscope for automatic analysis of blood cells, in particular when red blood cells are present in the preparation. It can also advantageously be used for control of structures, in particular of their extent in the direction of the optical axis.

According to a fourth aspect of the invention, it relates to a device which comprises a first focus analyzer, which is adapted to receive an electronic representation of a structure that has been reproduced through an objective, to analyze how an intensity in the electronic representation varies at the periphery of the structure, and to determine, by means of this intensity variation, a first focus value which indicates how the current focus position of the objective is related to an optimal focus position as regards the structure and a second focus value which indicates how the current focus position of the objective is related to an optimal focus position as regards the surroundings of the structure.

The advantages of the device are evident from the discussion above.

According to a fifth aspect of the invention, it relates to a storage medium, which can be read by a computer and on which a computer program is stored, which is intended to be used in an optical system. The computer program comprises instructions for making said computer analyze, in an electronic representation of a structure having a periphery, how the intensity varies at the periphery of the structure, and, by means of this intensity variation, determine an application focus value which indicates how the current focus position of an objective is related to an optimal focus position for the application at issue.

According to a sixth aspect of the invention, it relates to A computer-readable storage medium, on which a computer program is stored, which is intended to be used in an optical system and which comprises instructions for making the computer analyze, in an electronic representation of a structure, which has a periphery and which has been reproduced through an objective, how the intensity varies at the periphery of the structure and, by means of this intensity variation, determine a first focus value which indicates how the current focus position of the objective is related to an optimal focus position with regard to the structure and a second focus value which indicates how the current focus position of the objective is related to an optimal focus position with regard to the surroundings.

The computer programs can advantageously be installed later in a computer in an existing optical system, so that this can use the predictive focus measure for automatic focusing of an objective on a structure or for controlling the structure. The computer programs can of course also comprise instructions for implementing further steps of the above-discussed methods.

It should be emphasized that what has been said above regarding the inventive methods relates in applicable parts also to the devices and to the storage media with the computer programs.

The predictive focus measure is expected to function for a large number of different structures, and the invention is therefore expected to be applicable in many types of optical systems. As examples, mention can be made of medical microscopy, such as classification of red and white blood cells, and inspection of semiconductor circuits in connection with manufacture.

BRIEF DESCRIPTION OF THE DRAWINGS

The present invention will now be described in more detail by way of embodiments which refer to the accompanying drawings, in which.

DESCRIPTION OF PREFERRED EMBODIMENTS OF THE INVENTION

Figure 1:
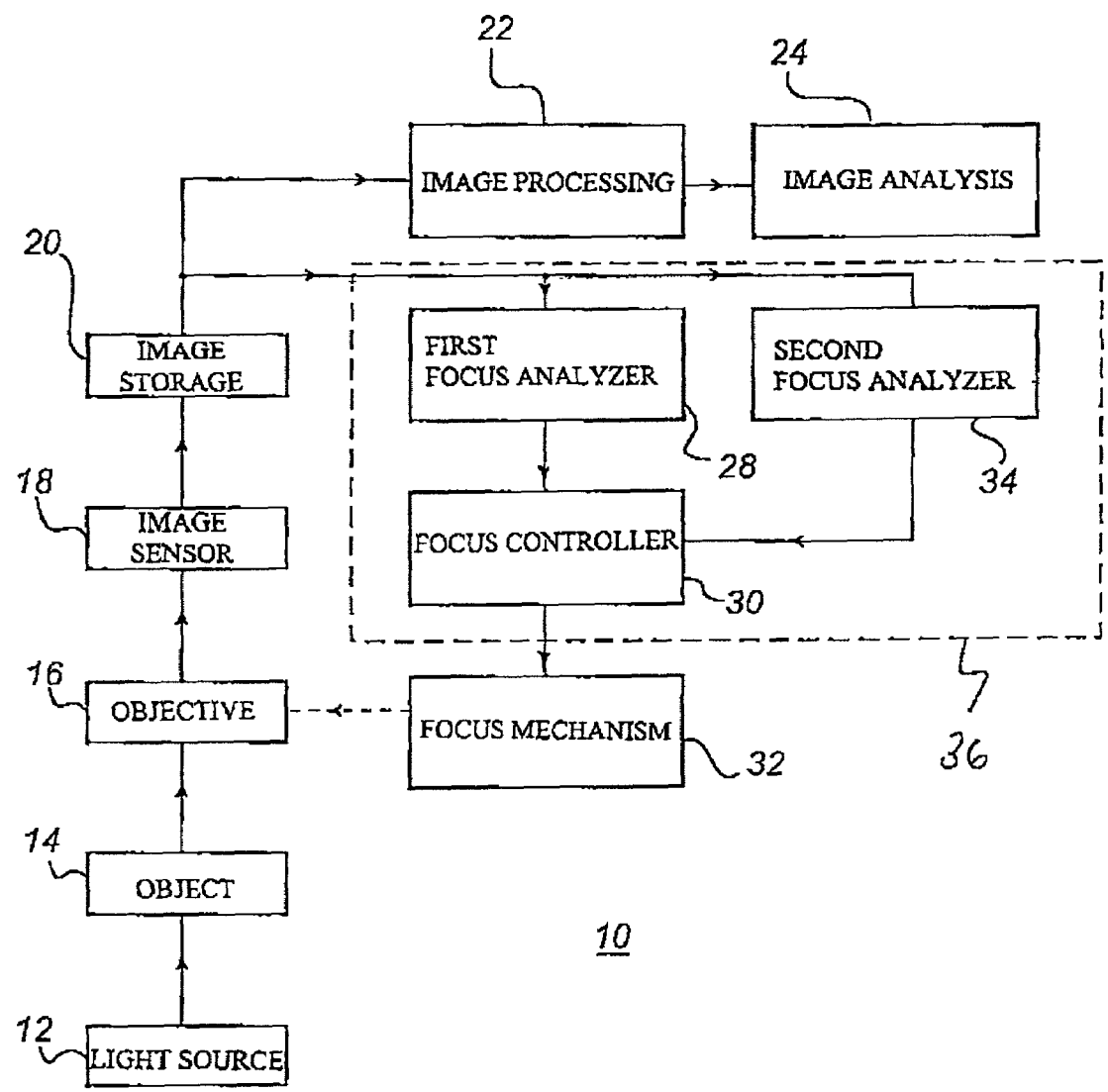
FIG. 1 is a schematic view of an automatically focusing microscope system according to an embodiment of the present invention, FIGS. 2a and b illustrate the effect of three different focus positions on a slide with printed calibration lines, FIGS. 3a and b illustrate the effect of five different focus positions on a stained red blood cell, FIGS. 4a and b illustrate the effect of five different focus positions on another stained red blood cell, FIGS. 5a and b illustrate the effect of three different focus positions on a stained white blood cell.

FIG. 1 is a schematic view of an optical system in the form of an automatically focusing microscope system 10. The microscope system 10 has a light source 12, which illuminates an object 14 which is to be studied in the microscope. The object 14 can be, for instance, a blood smear on a slide, in which one wants to study white blood cells, and in which red blood cells are used as a basis for automatic focusing.

The microscope system 10 further comprises an objective 16, which is adapted to reproduce by means of the light from the light source 12, that part of the object 14 which is within the field of view of the objective on a digital image sensor 18, which produces an image in electronic form. The image produced by the image sensor 18 is stored in an image storage 20. An image-processing unit 22 and an image-analyzing unit 24 are connected to the image storage 20. These units are intended for processing of the useful images from the image sensor 18. An example of processing that can take place in these units is automatic classification of the white blood cells in the above-mentioned blood smear. Since the units 22, 24 do not affect the automatic focusing and are known in the art, they will not be described in more detail.

An ocular (not shown) can be connected to the objective 16 for manual studying of the object 14.

The microscope system 10 further comprises a device for providing automatic focusing, which comprises, connected in series, a first focus analyzer 28 connected to the image storage 20, a focus controller 30, and a focus mechanism 32.

The focus mechanism 32, which may comprise, for instance, a motor, moves the objective 16 according to a control signal from the focus controller 30, which in turn generates the control signal on the basis of an application focus value received from the first focus analyzer.

The microscope system 10 also comprises a second focus analyzer 34 which can be used as a supplement or alternative to the first focus analyzer 28. The second focus analyzer operates with a traditional focus measure, such as the sample variance for the intensity in an image of the object, and will therefore not be described in more detail. The second focus analyzer can be used, for instance, to monitor the first focus analyzer and/or in other fields of operation than those of the first focus analyzer.

The two focus analyzers 28, 34 and the focus controller 30 can be implemented in hardware such as an ASIC or FPGA or preferably as software in a microprocessor 36, which is illustrated schematically in FIG. 1 with a dashed box around the focus analyzers and the focus controller.

The first focus analyzer with or without the focus controller and the second focus analyzer can be manufactured and sold separately from the remaining parts of the optical system or be mounted later in existing systems. It may also comprise one or more further parts of the optical system.

The first focus analyzer 28 operates as follows. It receives a digital image from the image storage 20. The image shows part of the object 14 and contains one or more structures which can be used for automatic focusing. To simplify the description, it is assumed that these structures are red blood cells. The focus analyzer 28 then locates in a first step a red blood cell. This can be carried out by using a conventional image-processing method, such as thresholding or segmenting, which also locates the periphery of the blood cell. The periphery need not be present in its entirety in the image, but only to such an extent that the structure can be identified and its periphery be located.

In the next step, the focus analyzer 28 determines the intensity at the periphery of the blood cell. What is of interest is the transition between the blood cell and its surroundings or background. The blood cell should be separated from other blood cells, at least along part of its periphery so that the image in this part of the periphery contains a clear difference in intensity between the cell and the surroundings, which can constitute a background or another structure on which the blood cell is superimposed.

Subsequently the focus analyzer 28 analyzes the appearance of the intensity variation. As will be described below, the analysis can be carried out on preprocessed intensity values, such as mean values. The parameters which are of interest in the analysis will be apparent from the experiments described with reference to FIGS. 2–7. According to given rules which implement the predictive focus measure, the focus analyzer 28 finally determines an application focus value. The focus value is transmitted to the focus controller 30 which determines a control signal for the focus mechanism 32 based the focus value. The detailed manner of determining the control signal depends on the application. Different applications may e.g. require different dynamics in the automatic focusing. This is a conventional regulating problem which could be solved by the skilled person.

The focus analyzer can use a neural network to determine an application focus value which indicates the distance and direction to the optimal focus position. Alternatively, the focus analyzer can use a model which is described in connection with FIG. 8 to determine the focus value.

Below follows a description of a plurality of experiments explaining how the focus position can be determined on the basis of the intensity variations that arise at the periphery or the edge of a structure.

The predictive focus measure is based on the fact that certain structures in misfocusing exhibit asymmetric effects at the periphery. FIG. 2a shows images 200, 210, 220 of a slide with imprinted free calibration lines, and FIG. 2b shows cross-sectional plots 230, 240, 250 for the intensity in the images in FIG. 2a. The uppermost image 200 in FIG. 2a is taken with the objective 1.5 μm above the position for the optimal focus. The uppermost image 230 in FIG. 2b is a cross-section of pixel values through the uppermost image in FIG. 2a. The intermediate image 210 in FIG. 2a and the associated cross-section 240 in FIG. 2b show the same part of the object at the optimal focus, while the lowermost image 220 in FIG. 2a and the corresponding cross-section 250 in FIG. 2b show the effect when the objective is located 1.5 μm below the position for the optimal focus.

The effects in the form of the amplitudes and width of overshoots and maximum inclination of the ramps in the image are not symmetric around the optimal focus and can therefore be used to decide whether an image is taken above or below the optimal focus. The sample variance (see Equ. 1 and 2) of the three images is, relative to the sample variance of the best focused one, from above downwards, about 0.165; 1 and 0.346, which indicates a skewness for the sample variance as focus measure. The lower image has a significantly higher sample variance than the one taken at a corresponding distance above the optimal focus. The reason for this is that the lowermost image has more overshoots than the upper. The sample variance would presumably not be a good focus measure for this object if the images had been collected in a series with a smaller space between the refocusing operations since the peak value for the sample variance probably does not coincide with the desired optimal focus. It is hardly no use calculating the sample variance of a high-pass filtered image since the high-pass filter lets through the high-frequency components of the overshoots which to a great extent are to be found in the lowermost image, but to a very small extent in the uppermost. It is expected that a predictive focus measure which is based on the above-mentioned asymmetric appearance of the intensity variation at the periphery of the structure would give a better result.

FIGS. 3a and b show another example of the asymmetric intensity variation. The structure is in this case a red blood cell stained according to the May-Grünwald-Giemsa method. Like in FIG. 2, the structure is reproduced (images 300, 310, 320, 330, 340) in a number of focus positions in FIG. 3a and with corresponding horizontal cross-sections thereof at the largest width of pixel values in the respective adjacent plots 350, 360, 370, 380, 390 in FIG. 3b. The focus positions are, from above downwards, +2.5; +1.5; −0.5; −1.5 and −2.5 μm, a negative value indicating that the objective is positioned below the position of the optimal focus. The two upper images 300, 310; 350, 360 have more or less terraced height differences, above all the average inclination and the width of the terraces in the image varying. The two lower images 330, 340; 380, 390 show more or less wide overshoot phenomena. The intermediate image 320; 370, the one taken 0.5 μm below the optimal focus, has the steepest change in intensity from background to object while at the same time its overshoots are the narrowest. The sample variance of the five images is relative to the sample variance of the best focused one, from above downwards, 0.365; 0.502; 1; 0.923 and 0.757, which also in this example indicates a skewness and unfitness of the sample variance as a focus measure in this case. On the other hand, the asymmetric intensity variations can be used to implement the predictive focus measure.

FIGS. 4a and b show one more example of the intensity variation. In this case the object is another red blood cell, which is also stained according to the May-Grünwald-Giemsa method. The cell at issue has some details in the center. The cell is not circular and therefore shows that the terracing and overshoot phenomena that follow from the misfocusings have the same form as the cell itself, i.e. slightly oval. The object is shown in FIG. 4a for a number of focus positions (images 400, 410, 420, 430, 440) which from above downwards are +2, +1, +0, −1 and −2 μm relative to the optimal focus. FIG. 4b does not show cross-sections but a kind of radial mean values 450, 460, 470, 480, 490. The individual cell images have been thresholded in two regions, an "outer" with the pixels having values above a specific threshold and an "inner" region with the pixels having values below a specific threshold, zero on the x axis indicating the thresholding point. As threshold, use is made of the mean value of the maximum and minimum pixel value in the respective images, which resulted in well cohering regions. Subsequently the radial mean values were calculated both inwards from the region border (negative values of the x axis) and outwards from the same. The radial mean values are much more stable than the somewhat noisy corresponding cross-sections in FIG. 3. It is therefore presently preferred that the predictive focus measure be based on radial mean values.

Also in FIG. 4b, the two upper images 450, 460 have more or less terraced intensity variations, in which above all the average inclination, corresponding to the width of the rings in the image, varies. In the transition to the background of the image (at positive radii) there are practically no overshoots at all. The two lower images 480, 490 show also in FIG. 4b more or less broad overshoot phenomena. The intermediate image 470, the one which is taken in the optimal focus, has the steepest change in intensity from background to object while at the same time its overshoots are the narrowest. The sample variance of the five images is, relative to the sample variance of the best focused, from above downwards, 0.656; 0.778; 1; 0.973 and 0.866, which indicates a skewness and unfitness of the sample variance as a focus measure also in this case. Once more, however, the intensity variations can be used for implementation of the predictive focus measure.

Finally, FIGS. 5a and b show an example of a white blood cell which is also stained as described above. A white blood cell frequently has many small details. More-over it causes two great intensity changes. One arises in the transition between the background and the so-called cytoplasm. The other in the transition from the cytoplasm to the nucleus. The white blood cell is shown in three focus positions (images 500, 510, 520 in FIG. 5a) which from above downwards are +2, ±0 and −2 μm. Owing to the details in the cytoplasm, it is more difficult to see the ring phenomena in this example compared with the above examples. On the other hand, it is still relatively easy to see the phenomena in the adjoining red blood cells (in the upper and lower right corners of the image). Furthermore the intensity variations have in the cross-sectional plots 550, 560, 570 in FIG. 5b different inclinations and different degrees of overshoots which can be used to determine the focus position. The sample variance of the three images is, relative to the sample variance of the best focused, from above downwards 0.791; 1; 0.862, which indicates a small skewness around the optimal focus. The sample variance had probably functioned less poorly as a focus measure of this white blood cell compared with the other objects above.

FIGS. 6a–c show the result of three ray-tracing experiments, which aim at explaining for which kinds of structure the asymmetric intensity variations arise. The experiments permit separated studies of height and intensity differences in a manner which is difficult to provide with red and white blood cells as well as calibration rules. In all cases, one-dimensional objects with a one-dimensional ray trace are simulated. Diffraction effects, if any, are not taken into consideration, and intensities are summed up regardless of phase in the sensor.

Figure 6:
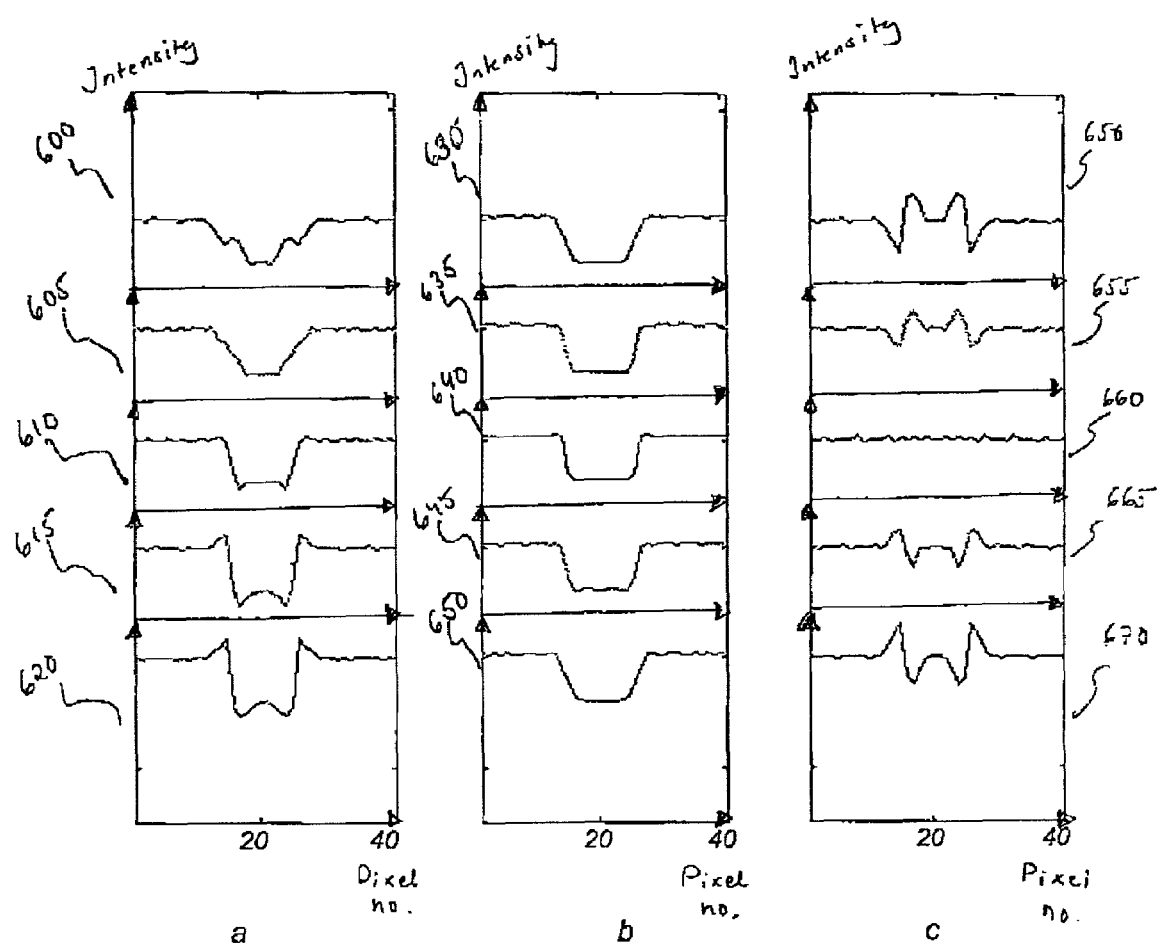
FIGS. 6a–c show results of ray-tracing experiments of three different objects each having five different focus positions.
Figure 7:
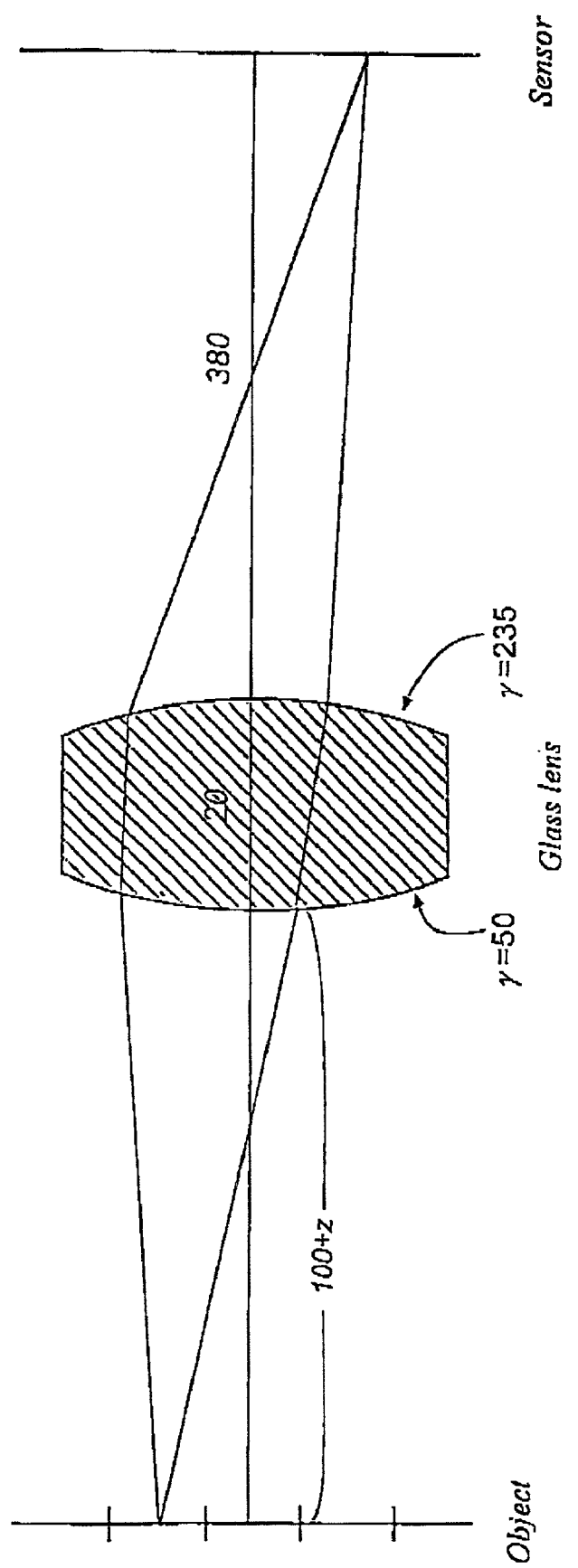
FIG. 7 shows the ray trace for the ray-tracing experiments in FIG. 6, FIGS. 8a–c illustrate schematically a model to explain the intensity variation that appears at the periphery of a structure.

More specifically the ray-tracing experiments consist in one-dimensionally following a number of rays per point of the object. Each individual ray is followed from the object via a lens with two spherical "surfaces" and until it reaches a one-dimensional image sensor. The reason for carrying out the experiment one-dimensionally is that it is easier than a two-dimensional tracing, but is all the same sufficient to resemble the effects observed in reality. All partial experiments are based on the ray trace illustrated in FIG. 7. The variations between the partial experiments consist in the height and intensity variation of the object and, owing to variations in height of the object, the distance object-lens. All measures are indicated in units of length (ul). The simulated part of the object is ±0.04 ul, while the intermediate part, i.e. the structure with height and intensity variations, is ±0.008 ul. The intensity of the sensor has been calculated for ±0.8 ul while only the interesting part of ±0.16 ul has been indicated in FIG. 6. The enlargement is about 4 times. The simulated wavelength is 633 nm. The focus steps in FIG. 6 are 0.1 ul. As refractive index at this wave-length, 1.5207 is used for glass and 1 for air. From each point, 19 rays are radiated, the angles of which to the optical axis are uniformly distributed in the range [−0.01; 0.01] radians, i.e. about ±0.57°. The experiment thus differs radically from a well-adjusted microscope, which can very well collect rays of ±60° from the optical axis. All the same, the ray-tracing experiments qualitatively produce the same effects as those which are to be found in the microscope images.

FIG. 6b shows the result of an object which has no height differences, but where the intensity goes down to 50% relative to the background in an area in the center of the structure. FIG. 6c shows the result of an object which has no intensity variations, but a plateau having a height of 0.5 ul of the same extent and position as the intensity change in FIG. 6b. FIG. 6a shows the result of an object which has both the intensity and height differ-ences from the other two objects.

In the five plots 630, 635, 640, 645, 650 in FIG. 6b it is evident that the intensities of the five resulting one-dimensional images are practically symmetric around the optimal focus. For such a situation, sample variance and sample variance-like focus measures function well. The sample variance of the five images is, relative to the sample variance of the intermediate one, from above downwards, about 0.89; 0.95; 1; 0.95 and 0.90.

In the five plots 660, 665, 670, 675, 680 in FIG. 6c it is to be seen that the intensities of the five resulting one-dimensional images, except for a change of sign, are practically symmetric around the optimal focus. For such a situation, sample variance and sample variance-like measures function well in such manner that it is a matter of minimizing the variance in order to find the position of the optimal focus. The sample variance of the five images is, relative to the sample variance of the lowermost, from above downwards, about 0.99; 0.31; 0.02; 0.32 and 1. It should be noted that for the isolated differences owing to height, it is possible to see in the images, but not in the sample variance, also the sign of the focus error.

Figure 2:
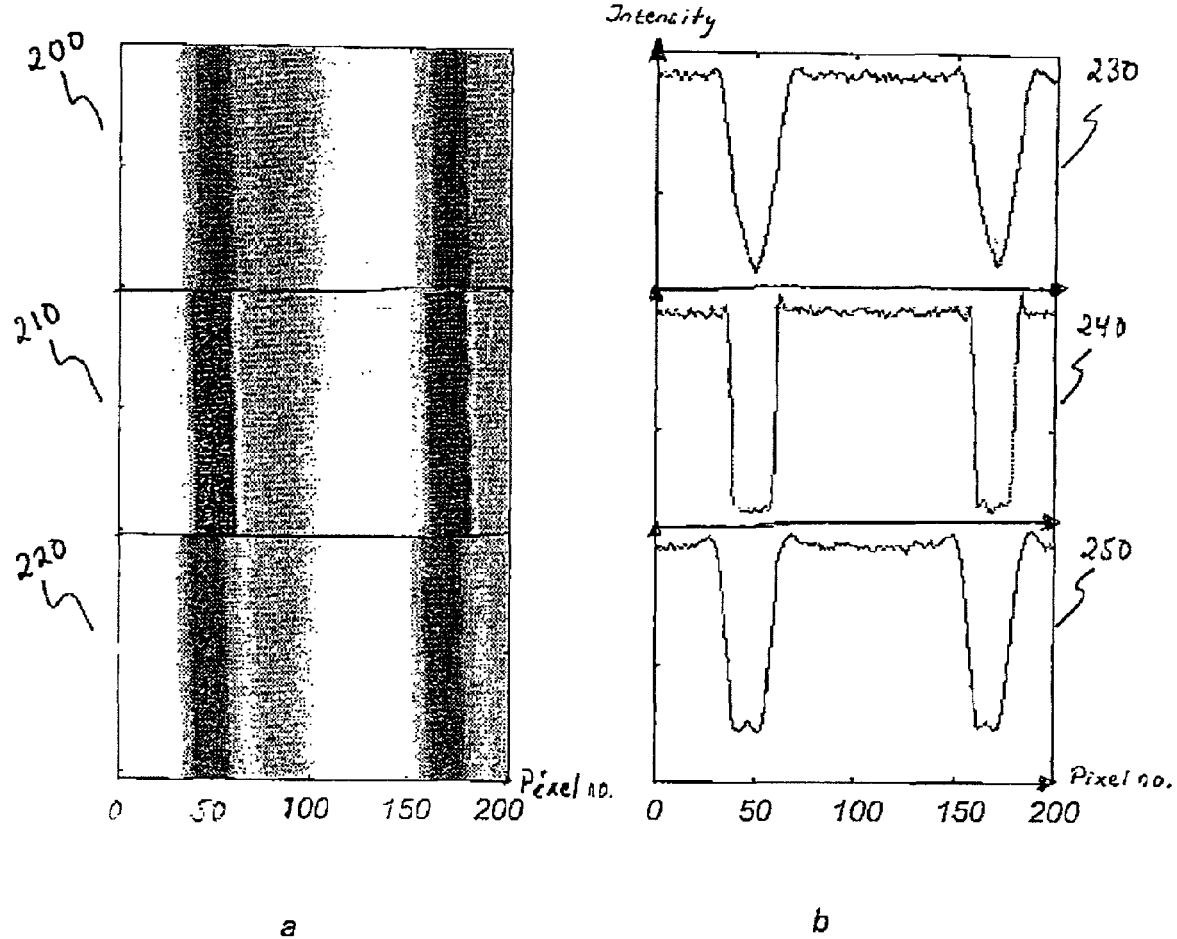
Figure 3:
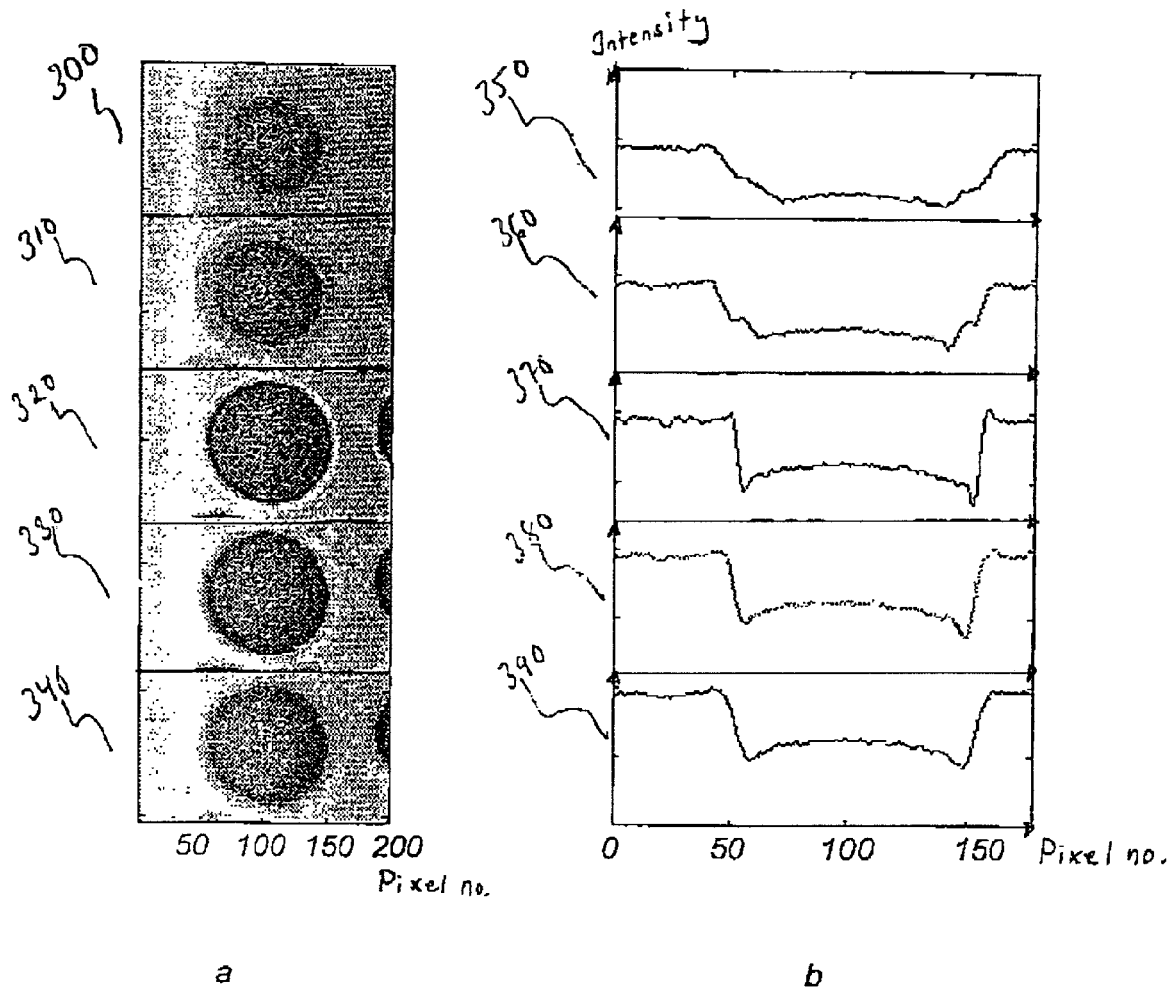
Figure 4:
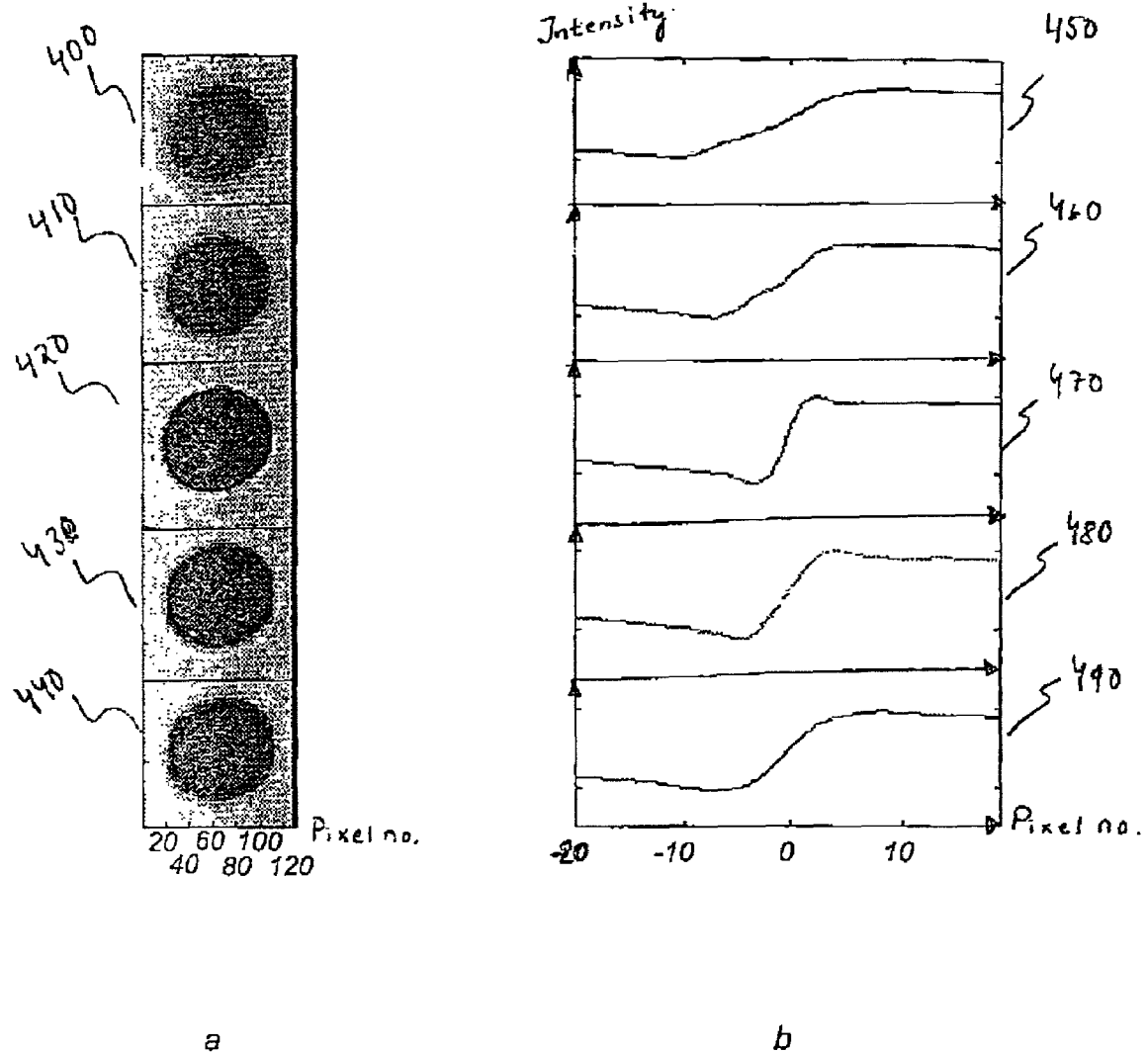
Figure 5:
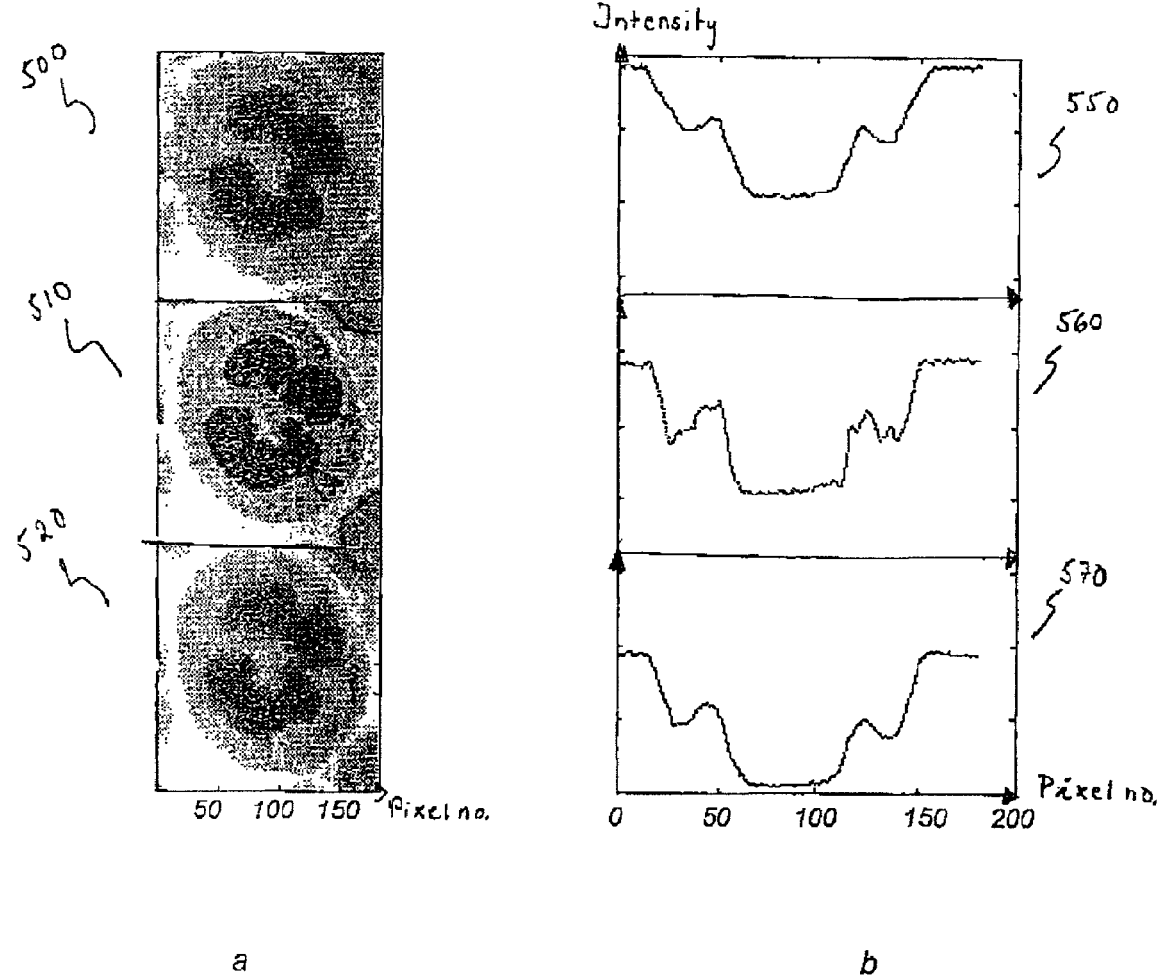

In the five plots 600, 605, 610, 615, 620 in FIG. 6a, the intensities of the five resulting one-dimensional images have asymmetric intensity variations similar to the ones in FIGS. 2–4 above. It is more difficult to make a direct comparison with FIG. 5. At the same time the intensities in the individual plots in FIG. 6a seem to be, qualitatively seen, the amount of the respective plots in FIGS. 6b and 6c. The sample variance of the five images is, relative to the sample variance of the lowermost, from above downwards, about 0.43; 0.49; 0.64; 0.84 and 1. For such a situation, sample variance does not function at all as a focus measure, although it is a measure that functions well in FIG. 6b as well as in FIG. 6c, although with a minimum.

The sample variance can thus be suitable for intensity-caused differences as well as for those owing to height as long as they are isolated, but not necessarily when they exist simultaneously. On the other hand, in the cases in FIGS. 6a and 6c there are asymmetric intensity variations at the periphery of the structures which can be used to implement the predictive focus measure which then gives a peak for the desired optimal focus and besides makes it possible to determine the direction and amount of focus correction on the basis of a single image.

With a view to separating the effects of intensity differences, which result in a practically symmetric effect around the position of the optimal focus and the effects of height differences, which result in a practically skew-symmetric effect, the following analysis is suggested:

The sample variance of an image is defined as $$V(A_k) = \frac{1}{(mn-1)} \sum_{i=1}^{m} \sum_{j=1}^{n} \tilde{a}_{ijk}^2, \qquad \text{(Equ. 1)}$$

wherein $$\tilde{a}_{ijk} = a_{ijk} - \frac{1}{mn} \sum_{i=1}^{m} \sum_{j=1}^{n} a_{ijk}, \qquad \text{(Equ. 2)}$$

i.e. the image adjusted to the sample mean value zero.

A series of images $\{A\_(-n), A\_(1-n), \ldots, (A\_n)\}$ are taken equidistantly (i.e. with a constant difference in physical focus distance) with the focus, which is the optimal for the application at issue, of the intermediate image, image A_0.

The original series is divided into two series of images: $\{B\_(-n), B\_(1-n), \ldots, B\_n\}$ and $\{C\_(-n), n \ldots, C\_n\}$ defined by $B\_k=(A\_k+A\_(-k))/2$ and $C\_k=(A\_k-A\_(-k))/2$.

The division is unambiguous and always exists. Specifically $B\_0=A\_0$ and $C\_0=0$. The B series is symmetric around $B\_0$ since $B\_(-k)=(A\_(-k)+A\_k)/2)=(A\_k+A\_(-k))/2=B\_k$ and the C series is skew-symmetric around $C\_0$ since $C\_(-k)=(A\_(-k)-A\_k/2=-(A\_k-A\_(-k))/2=-C\_k$.

The A series is now divided into a symmetric series, corresponding to the symmetric appearance in FIG. 6b, and a skew-symmetric, corresponding appearance in FIG. 6c. Each original image A_k can be produced again according to $A\_k=B\_k+C\_k$.

The sample variance being symmetric around A_0 is equivalent to $V(A_k)-V(A_{-k})=0$ for all k's. Therefore the following is studied $$\sum_{i=1}^{m}\sum_{j=1}^{n}\tilde{a}_{ijk}^2 - \sum_{i=1}^{m}\sum_{j=1}^{n}\tilde{a}_{ij-k}^2 = \sum_{i=1}^{m}\sum_{j=1}^{n}\left((\tilde{b}_{ijk}+\tilde{c}_{ijk})^2 - (\tilde{b}_{ij(-k)}+\tilde{c}_{ij(-k)})^2\right) =$$

$$= \sum_{i=1}^{m}\sum_{j=1}^{n}\left((\tilde{b}_{ijk}+\tilde{c}_{ijk})^2 - (\tilde{b}_{ijk}-\tilde{c}_{ijk})^2\right)$$

$$= \sum_{i=1}^{m}\sum_{j=1}^{n}\left((\tilde{b}_{ijk}\tilde{b}_{ijk} + 2\tilde{b}_{ijk}\tilde{c}_{ijk} + \tilde{c}_{ijk}\tilde{c}_{ijk}) - \right.$$

$$= (\tilde{b}_{ijk}\tilde{b}_{ijk} - 2\tilde{b}_{ijk}\tilde{c}_{ijk} + \tilde{c}_{ijk}\tilde{c}_{ijk})) =$$

$$= \sum_{i=1}^{m}\sum_{j=1}^{n} 4\tilde{b}_{ijk}\tilde{c}_{ijk}$$

which is, except for a factor, the sample correlation for B_k and C_k.

From this follows that if the B_k's are significantly correlated with the respective C_k's, the variance will not be symmetric around the desired optimal focus and, thus, will most probably not have its maximum in the desired position either.

For the purpose of practically removing the correlation between the B and C series, different filters could be applied to the A series and, thus, also to the resulting B and C series. However, it is difficult to find a filter which does so for arbitrary intensity and height variations.

For a common type of object, two cases arise:
1) The C images are (close to) zero, which results in the correlation with corresponding B images being (close to) zero and, thus, the variance giving a symmetric measure.
2) The C images are significantly different from zero, which can be divided into two partial cases:
   2.1) The correlation between the B and the respective C images is (close to) zero, either for raw images or for filtered images. Variance can probably be used, but it will be susceptible to altered conditions of the object. The predictive focus measure, however, is expect-ed to produce good results and should be used.
   2.2) The correlation between the B and the c images is significantly different from zero in spite of filtration. Variance-based focus measures do not produce good results even on the filtered images. On the other hand, the predictive focus measure is expected to produce good results.

The simplest experiment to find out whether the case 2.2 occurs or not is to see in the application at issue whether the variance, possibly after filtration of the images, gives a symmetric focus function with the peak in the optimal focus position which is desired for the application.

On the basis of the above experiments, above all that in FIG. 4 with the radial mean value formation, but also to some extent the simulations in FIG. 6, the following summarized intensity variation behavior can be used in a predictive focus measure for the red blood cells:
1) A focus position above the optimal focus causes a terraced transition from the background to the interior of the structure. Practically no overshoots exist in the background.

If anything, intensity will come asymptotically creeping up to that of the background—"undershoots". The width of the terraces and of the "undershoots" depends on the amount of the misfocusing.

2) A focus position in the center of or close to the optimal focus means that the transition from the background has a large greatest inclination and that the overshoots of the transition become narrow. The limit values of what is a great inclination and a narrow overshoot, respectively, probably depend both on the preparation and on the optical system including the sensor. A so-called sharpening filter can possibly both increase the greatest inclination and reduce the width of the overshoot simultaneously. The overshoots are most easily to be seen in the background since it has small natural variations. No terraces occur in the transition.

3) A focus position below the optimal focus results in overshoots, which are most easily to be seen in the background where the width of the overshoot depends on the amount of the misfocusing. No terraces occur in the transition.

By measuring the height of the overshoots, the width of the overshoots, the greatest inclination and—in the absence of overshoots—the width of the undershoots down to, for instance, 90% of the background intensity, data is available for obtaining, by applying rules and expressions based on items 1–3 above, a value of the predictive autofocus measure. For example, a neural network can be trained with the observations of the parameters suggested above combined with the corresponding known application focus values. Neural networks and the use thereof are well-known to the skilled person, see e.g. "Neural Networks for Pattern Recognition" by Christopher M Bishop, Oxford Press, ISBN: 0198538642. The neural network can be part of the first focus analyzer 28.

The above-mentioned rules probably do not function completely for white blood cells, but it is assumed that by making the corresponding experiments, it is possible to develop suitable rules for white blood cells and other structures.

If the structures have no interfering internal details, an attempt at detecting the presence of terraces and an estimate of the width thereof can possibly provide more useful information. A way of facilitating the detection of terraces is the use of a modified so-called segmentation of the images. The modification consists in not only segmenting out cells which stand out from the background but also segmenting out terraced intensity patterns.

The analysis of the intensity variations results in an estimate of the refocusing need both in respect of sign and amount. In the analysis one may want to use segmentation and subsequent radial mean values of pixel intensity. This is the case for, for example, round and oval cells. However, on linear objects such as line paths in semiconductor circuits, it is possible to analyze the pixel intensity one-dimensionally along lines or mean values of a plurality of lines.

Furthermore, it should be mentioned that in all the experiments described above, an experimental set-up of the components below has been used.
Microscope frame: Olympus BX50-WIF
Condenser: Olympus U-SC2 with the top lens used, NA=0.9
Power supply: Olympus TH3
Bulb socket: Olympus U-LH100L
Bulb: Osram HLX 64625 (12V 100W Xenophot), halogen
Objective: Olympus UplanF1 100X 1.30/oil
TV adapter: Olympus U-TV1.0X
Camera adapter: Olympus U-SMAD
Trinocular tube: Olympus U-TR30
Immersion oil: Cargille catalog No. 16482
Sensor: Sony 9100.
Frame grabber: Matrox Meteor II In the images, a pixel corresponds to about 0.08 µm of the object, i.e. there are about 12 pixels per micro-meter. In all figures, the green (G) component from an RGB sensor has been used. In FIG. 3, the source of illumination was filtered through a green narrow-band filter with transmission at 550±5 nm.

Figure 8:
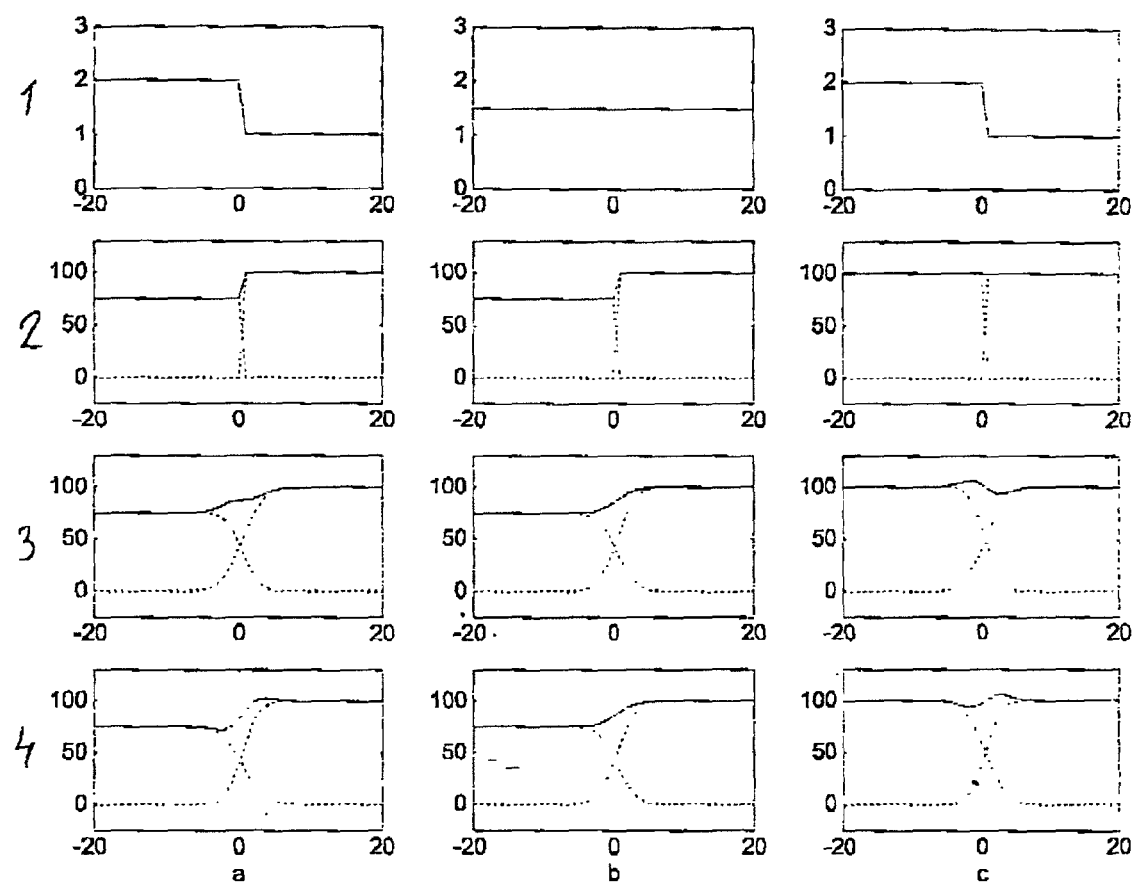

In the following a simple model for the above-described phenomena will be described with reference to FIG. 8.

When a structure, which can be a complete object or part of an object, is reproduced with an optical reproducing system, such as a microscope objective, on an image sensor, there are optical limitations for which depth of focus can be obtained. When a structure borders on surroundings, which can be another structure or a background, through a height difference, which is significant in relation to the depth of focus of the reproducing system, both the structure and the surroundings cannot be reproduced simultaneously with a maximum sharpness. An example of this is a red blood cell, which is smeared on a slide and reproduced through a microscope objective with a numerical aperture around 1.3.

As described above with reference to FIGS. 3*a* and 4*a*, asymmetric reproducing effects appear around the periphery in images which are symmetrically positioned around the optimal focus position (corresponding to the intermediate images in FIGS. 3*a* and 4*a*). The ray-tracing experiments in FIGS. 6 and 7 indicate that it is the height differences between the structures which cause the asymmetric reproducing effects. This is the case whether there are differences in emitted intensity between the structure and the surroundings or not.

A simple example of when the asymmetric effect occurs is when there are two semiplanes, below referred to as the left and the right semiplane, which have a common border in the form of a step in height. In this example, the left semiplane can correspond to a structure and the right semiplane to the surroundings of the structure. By height is here meant the position along the optical axis, see the height as a function of the x coordinate in FIG. 8*c*:1 (at the top). The simplest, but completely sufficient way to obtain asymmetric effects is when the two semiplanes emit light with intensities that vary neither within nor between the respective semiplanes. See the unbroken intensity curve as a function of the x coordinate in FIG. 8*c*:2. The semiplane combination is modeled as two superimposed, co-localized complementary steps in emitted intensity, one for each semiplane, see the two dashed curves in FIG. 8*c*:2. The position of these two steps, in the plane perpendicular to the optical axis of the system, is set to coincide with the position of the height step. The first step is the step in intensity between the intensity emitted in the left semiplane down to zero in intensity for all positions to the right of the height step. Correspondingly, the second step is the complementary step in intensity between zero in intensity for all positions to the left of the height step to the intensity emitted in the right semiplane.

The height information is incorporated in the model by these two intensity steps being localized at a height each, i.e. in a position each along the optical axis. The two intensity steps are processed separately when passing through the reproducing system and are then each reproduced with a height-dependent sharpness. FIG. 8*c*:3 illustrates the reproduced intensity steps as two dashed curves when the focus plane of the objective, i.e. its current focus position, is at the height z=3. The intensity step of the left semiplane, with focus position deviation 1, is then reproduced more sharply than that of the right semiplane, which has focus position deviation 2. The sum of the intensity of the images is shown by an unbroken line. In FIG. 8c:4, the focus position deviations are changed owing to the focus plane of the objective being at the height z=0. A comparison of 8c:3 and :4 indicates an asymmetric effect which is similar to the one in FIG. 6c.

The focus position deviations thus indicate how the current focus position of the objective is related to the optimal focus position with regard to the structure and the surroundings, respectively. These focus position deviations are in other places in this specification referred to as the first and the second focus value.

For a structure having the height difference zero from its surroundings, the two intensity steps will be located at the same height. See FIGS. 8b:1 and :2 where the two semiplanes have been given different emitted intensity. This results in the two focus position deviations being identical independently of the position of the focus plane of the objective and a symmetric effect being obtained, see FIGS 8b:3 and :4, which is similar to the one in FIG. 5b.

FIG. 8a shows a combination of the cases in 8b and 8c. The result in FIGS. 8a:3 and :4 is similar to that in FIG. 6a and that in FIG. 4b.

In conclusion, this simple example exhibits asymmetric effects which explain the phenomena that appear in focusing on red blood cells.

The model can be used to estimate, from curves such as those in FIGS. 8a:3 and 8a:4, unknown parameters such as emitted intensity in the left and the right semiplane and, above all, knowing the characteristics of the objective, the focus position deviations of the left and the right semiplane. With estimated focus position deviations for the two semiplanes and knowing which of them is closest to the objective, it is then easy to calculate, in the cases 8a and 8c, where in relation to the desired focus plane or focus position the current focus plane or focus position of the objective is located. In the case 8b, only information about how far away from the focus plane of the objective one is positioned, not on which side, will be obtained.

In the example with blood, the structure can be a red cell, in which case the first focus value or the focus position deviation indicates how far away the current focus plane of the objective is from the red blood cell. The surroundings can be the slide on which the red blood cell is arranged. The second focus value or the focus position deviation thus indicates how far away the current focus plane of the objective is from the slide. The object which is to be studied in the microscope can be a white blood cell which is thin and therefore is located at about the same height as the slide. The focus should thus be essentially on the slide. Knowing this, it is possible to calculate, on the basis of the focus values, an application focus value and from that how the objective and the slide are to be moved relative to each other in order to achieve an optimal relative position.

Besides using the model for focusing, it is also possible to use it to test how an actual structure combination (border area between structure and surroundings) of an object, such as an IC wafer, is related to an assumed structure combination. An optical reproduction of the actual structure combination is then compared with simulated reproductions of the assumed structure combination. For each simulated reproduction, focus position deviations are used, which depend on the assumed structure combination and a simulated position of the focus plane of the optical reproducing system. As long as the actual structure combination is similar (height and inclination) to the assumed structure combination, there will be a simulated reproduction which is correspondingly similar to the optical reproduction. Which of the simulated reproductions it is depends on how the focus plane of the optical reproducing system is related in height to the actual structure combination.

It is the intensities emitted by the object that affect the reproduction. Therefore the model functions whether the emitted intensities originate from transmission illumination or reflection illumination of the object.

A person skilled in the art can modify the above model which relates to bright field microscopy other kinds of optical applications where significant height differences occur.

When extending to general structure combinations, of course, the model for the height difference is important. A red blood cell can be modeled as a circle raised from a round loaf with a hole which is precisely the circle. In such a model, two-dimensional filters corresponding to the reproductions of the objective are then applied. However, it is easier to convert the image into a radial mean value as has been done in FIG. 4b, whereupon one-dimensional filters corresponding to the reproductions of the objective can advantageously be used.

Figure 9:
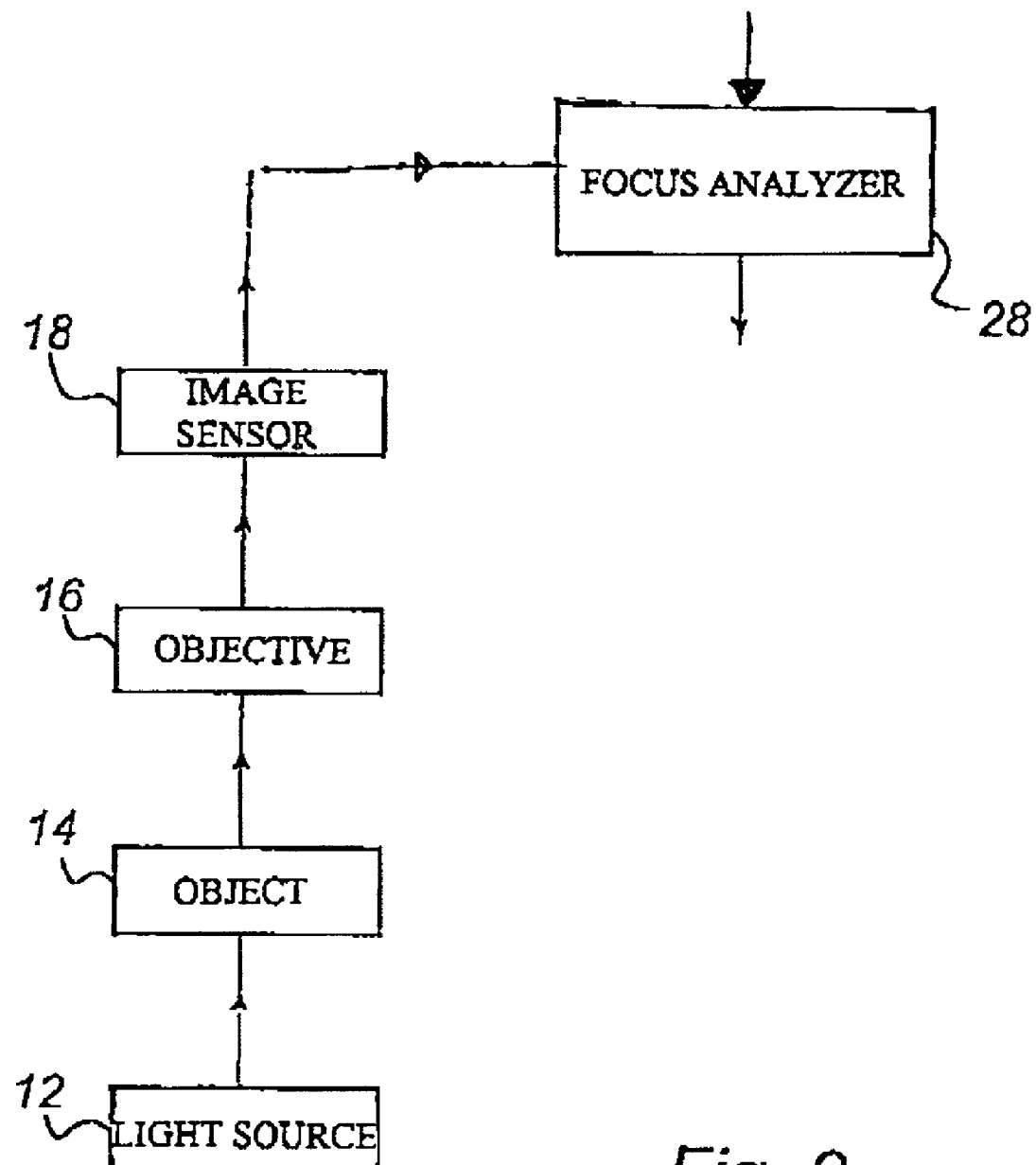
FIG. 9 illustrates schematically an optical system for automatic control of a structure in accordance with an embodiment of the present invention.

FIG. 9 describes an example of an optical system which can be used for automatic control of an object.

The optical system comprises a light source 12, an objective 16, an image sensor 18, and a focus analyzer 28. The physical components can be the same as those in the optical system in FIG. 1. The function of the system, however, is different.

The light source 12 illuminates the object 14 that is to be controlled. The object can be, for example, a semiconductor circuit where the depth of an etching pattern is to be controlled. The etching pattern is then a structure having a periphery in the transition to the surroundings. The objective 16 reproduces that part of the object which is within its field of view. An electronic representation of the reproduction can be produced by means of the image sensor 18. This electronic representation is received by the focus analyzer 28, which analyzes the intensity variation at the periphery. There is a desired depth of the etching pattern, that has been supplied to the focus analyzer 28. The focus analyzer uses the information about the desired depth in the above described model, which models the periphery as two superimposed complementary co-localized intensity steps, and simulates by means of this model a plurality of intensity variations corresponding to different current focus positions of the objective. If one of these intensity variations conforms sufficiently well with the intensity variation in the electronic representation, the actual etching depth is considered to be the desired. Otherwise the etching depth is considered not be the desired, in which case the focus analyzer gives the alarm.

Finally, it should be mentioned that currently the most preferred embodiment of the invention comprises the use of the above-described model for the determination of the application focus value as well as the first and the second focus values.

What I claim and desire to secure by Letters Patent:

1. A method for automatic focusing in a microscope system, comprising the steps of reproducing a structure having a periphery by means of an objective, generating an electronic representation of the structure reproduced by the objective, analyzing an intensity variation in the electronic representation at the periphery of the structure, and determining, by means of said intensity variation, an application focus value indicating how the current focus position of the objective is related to an optimal focus position, wherein the application focus value indicates whether the current focus position of the objective is above or below the optimal focus position and how far away the current focus position of the objective is from the optimal focus position.

2. A method as claimed in claim 1, further comprising the step of generating, on the basis of said application focus value, a control signal for changing the mutual positioning of the objective and the structure to provide a desirable focusing.

3. A method as claimed in claim 2, wherein the control signal is generated on the basis of said application focus value only.

4. A method as claimed in claim 1, wherein the electronic representation is produced by means of a single light-sensitive sensor and for a single exposure.

5. A method as claimed in claim 1, wherein the step of analyzing how the intensity varies at the periphery of the structure comprises using predetermined information about the appearance of the intensity variation in different focus positions of the objective in relation to the optimal focus position.

6. A method as claimed in claim 1, wherein the step of analyzing the intensity variation at the periphery of the structure comprises measuring at least one of the following parameters for the intensity variation: the inclination, the height of an overshoot, the width of an overshoot, the width of an undershoot, the presence of a terrace, and the width of a terrace.

7. A method as claimed in claim 1, wherein the step of analyzing how the intensity varies at the periphery of the structure comprises analyzing the intensity variation essentially perpendicular to the periphery.

8. A method as claimed in claim 7, wherein the step of analyzing the intensity variation essentially perpendicular to the periphery comprises forming radial mean values of the intensity.

9. A method as claimed in claim 1, wherein the structure is such that the intensity variation in the electronic representation of the structure is asymmetric for focus positions around the focus position which provides optimal focusing of the objective on the structure.

10. A method as claimed in claim 1, wherein the step of determining the application focus value comprises determining a first focus value which indicates how the current focus position of the objective is related to the optimal focus position of the structure and a second focus value which indicates how the current focus position of the objective is related to the optimal focus position of surroundings of the structure.

11. A method as claimed in claim 10, wherein the step of determining a first and a second focus value comprises simulating a plurality of intensity variations at the periphery of the structure for simulated, varying first and second focus values, and selecting the first and the second focus value which correspond to the simulated intensity variation which best conforms with the intensity variation in the electronic representation.

12. A method as claimed in claim 11 wherein the step of simulating uses a model according to which the periphery of the structure is modeled as two superimposed, co-localized complementary steps in emitted intensity.

13. A method as claimed in claim 10, further comprising the step of estimating a height difference between the structure and the surroundings of the structure at the periphery of the structure on the basis of the first and second focus value.

14. A method as claimed in claim 1, which method is used in connection with analysis of blood.

15. A method for automatic focusing in an optical system comprising the steps of reproducing a structure having a periphery and surroundings by means of an objective, generating an electronic representation of the structure reproduced by the objective, analyzing an intensity variation in the electronic representation at the periphery of the structure, and determining, by means of the intensity variation, a first focus value which indicates how the current focus position of the objective is related to an optimal focus position with regard to the structure and a second focus value which indicates how the current focus position of the objective is related to an optimal focus position with regard to the surroundings.

16. A method as claimed in claim 15, further comprising the step of controlling the structure on the basis of the first and second focus value.

17. A method as claimed in claim 15, wherein there is a known expected height difference between the structure aid the surroundings at the periphery of the structure and wherein the step of determining the first and the second focus values comprises simulating a plurality of intensity variations at the periphery of the structure for simulated varying current focus positions of the objective under consideration of the expected height difference, and selecting the simulated intensity variation which best conforms with the intensity variation in the electronic representation, the first and the second focus value being determined on the basis of the corresponding simulated current focus position, and further comprising the step of checking whether the actual height difference between the structure and the surroundings conforms with the expected height difference on the basis of the degree of conformity between the selected simulated intensity variation and the intensity variation in the electronic representation.

18. A method as claimed in claim 15, wherein the step of determining a first and a second focus value comprises simulating the intensity variation at the periphery of the structure for simulated, varying first and second focus values, selecting the first and the second focus value which correspond to the simulated intensity variation which best conforms with die intensity variation in the electronic representation, and estimating the height difference between the structure and its surroundings on the basis of the first and the second focus value.

19. A method as claimed in claim 17, wherein the intensity variations are simulated by means of a model according to which periphery of the structure is modeled as two superimposed, co-localized complementary steps in emitted intensity.

20. A device for automatic focusing in a microscope system, comprising a first focus analyzer (28), which is adapted to receive an electronic representation of a structure reproduced through an objective (16), to analyze an intensity variation in the electronic representation at the periphery of the structure, and to determine, by means of said intensity variation, an application focus value which indicates how the current focus position of the objective is related to an optimal focus position, wherein the first focus analyzer (28) is adapted to determine the application focus value which indicates whether the current focus position of the objective is above or below the optimal focus position and how far away the current focus position of the objective is from the optimal focus position.

21. A device as claimed in claim 20, further comprising said objective (16) through which the structure has been reproduced, and a light sensitive sensor (18) for producing the electronic representation of the structure.

22. A device as claimed in claim 20, further comprising a focus controller (30) which is adapted to generate, on the basis of said focus value from the focus analyzer (28), a control signal to a focus mechanism (32) for controlling the mutual positioning of the objective and the structure.

23. A device as claimed in claim 21, wherein the sensor (18) is a digital area sensor and the electronic representation is a digital image.

24. A device as claimed in claim 21, wherein the sensor (18) is the sensor of the microscope system for producing useful images.

25. A device as claimed in claim 22, further comprising a second focus analyzer (34) for producing, an alternative application focus value, said second focus analyzer (34) being connected to said sensor (18) for receiving said electronic representation and to the focus controller (30) for generating a control signal.

26. A device as claimed in claim 20, wherein the first focus analyzer (28) is adapted to analyze how the intensity varies at the periphery of the structure by measuring at least one of the following parameters in the intensity variation: the inclination, the height of an overshoot, the width of an overshoot the width of an undershoot, the presence of a terrace, and the width of a terrace.

27. A device as claimed in claim 20, wherein the first focus analyzer (28) comprises a neural network.

28. A device for automatic focusing in an optical system, comprising a first focus analyzer (28) which is adapted to receive an electronic representation of a structure reproduced through an objective, to analyze how an intensity in the electronic representation varies at the periphery of the structure, and to determine, by means of said intensity variation, a first focus value which indicates how the current focus position of the objective is related to an optimal focus position with regard to the structure, and a second focus position which indicates how the current focus position of the objective is related to an optimal focus position with regard to surroundings of the structure.

29. A computer-readable storage medium, on which a computer program is stored, which is intended for automatic focusing in a microscope system and which comprises instructions for making a computer analyze, in an electronic representation of a structure, which has a periphery aid which has been reproduced through an objective, the intensity variation at the periphery of the structure and, by means of the intensity variation, determine an application focus value which indicates how the current focus position of an objective is related to an optimal focus position, wherein the instructions comprise instructions for determining the application focus value which indicates whether the current focus position of the objective is above or below the optimal focus position and how far away the current focus position of the objective is from the optimal focus position.

30. A computer-readable storage medium, on which a computer program is stored, which is intended for automatic focusing in an optical system and which comprises instructions for making a computer analyze, in an electric representation of a structure, which has a periphery and which has been reproduced through an objective, the intensity variation at the periphery of the structure and, by means of the intensity variation, determine a first focus value which indicates how the current focus position of the objective is related to an optimal focus position with regard to the structure and a second focus value which indicates how the current focus position of the objective is related to an optimal focus position with regard to surroundings.

31. A method as claimed in claim 15, which method is used in connection with control of semiconductor circuits.

* * * * *